United States Patent Office 3,062,445
Patented Nov. 6, 1962

3,062,445
SYSTEM FOR ELECTRONIC TRANSFORMATION OF ANALOGUE VALUES INTO DIGITAL VALUES
Martin Kassel, Munich-Grafelfing, Germany, assignor to Kienzle-Apparate G.m.b.H., Villingen, Black Forest, Germany
Filed Dec. 4, 1956, Ser. No. 626,150
Claims priority, application Germany Dec. 10, 1955
12 Claims. (Cl. 235—154)

The invention relates to a system for handling mathematical, physical, technical and similar values, e.g. for measuring and controlling purposes, and especially values to be calculated. More particularly the invention relates to a system of the above kind in which the input values are represented by analogue values, which are electronically transformed into digital output values.

The invention is specially directed to a system for electronic calculating in which the analogue input values are transformed into digital output values.

In the application of this system in electronic calculating devices, e.g. of the type disclosed in my prior U.S. Patent No. 2,936,956, it has been proposed to represent numerical values especially in the decimal system by a corresponding number of electric pulses of equal magnitude. The values to be handled were, for this purpose, set up in a first and in a second control device successively coupled with a pulse-multiplying device digit by digit with the help of an electronic step-switch system. The values of both control devices were, for instance, set up in electric potentiometer arrangements, the partial voltages resulting therefrom being applied to pulse-shaping devices for the formation of pulses of a width corresponding to the voltage applied. These pulse-shaping devices were monovibrators or the like. The duration of the output pulses of such pulse-shaping devices was, therefore, proportional to the digital values introduced. These output pulses were converted into pulse trains, the number of pulses in each trains digitally representing the original value.

The above described process works according to the analogue method in its first part, the output values then being digitally, particularly decimally, represented.

The analogue method is particularly susceptible to any deviations from the correct values in the arrangements used therefor and the variations must be maintained within permissible limits under all circumstances. In the range of the lower digital values, for instance of the values 1, 2 and 3, the permissible variations can easily be maintained, since the partial voltages established in this case, for instance 1, 2 or 3 volts, and the corresponding pulse widths of 10, 20 or 30 microseconds were clearly distinguishable from each other even when the partial voltages and the pulses produced therefrom deviated from their nominal values by 50 or 33⅓%. The higher the values became, however, the greater the difficulties, since in the range of these higher values maximum deviations of only ±5% from the nominal values were permissible with the arrangements used heretofore.

If there are several subsequent electronic processes in the transformation between analogue and digital values, the deviations between the actual and the nominal values can, under the most unfavorable circumstances, accumulate. The sum of these deviations consists of inexactitudes in the resistors, capacitors, voltages, amperages, the qualities of tubes and the like, and it is extremely difficult to keep these deviations so small in the range of the higher values that they do not exceed the permitted variation of ±5%.

It is the object of this invention to avoid these difficulties. The invention is therefore directed to a system for transforming analogue input values into digital output values in which the range of permissible variation is increased.

The invention therefore consists of a system for electronically transforming analogue input values into digital output values in which, in the electronic transformation arrangement, the relationship between the analogue input values and the digital output values is at least partially non-linear. The invention further provides that the ratio between the digital values and the corresponding analogue values shall at least in the range of the higher digital values, progressively increase. Preferably the relationship between the digital values and the non-linearly increasing analogue values shall follow an exponential function.

Thus, the invention utilizes discrete input voltages which may be tapped off as potentials from the branches of a voltage divider between the input terminals thereof. It requires a clear differentiation of the signals for higher as well as lower input values even when the percentual deviations in the electrical converting means and the electrical voltages and currents are identical for these higher and lower values (i.e. for the potentials derived from the higher and lower-voltage portions of the voltage divider. A value of e.g. digital "8"±15% thus must not overlap the digital values "7" and "9," even as the value "1"±15% must not overlap the digital values "0" and "2". For this reason, according to the invention, the potential scale analogous to these values is expanded exponentially or in similar manner. For the purpose of generating pulses in a decimal code a translation of the non-linear potential scale into decimal pulse groups is effected through a novel pulse-producing arrangement resulting in a progressively increased spacing between at least the later pulses of each decimal pulse train.

By means of the system according to the invention there is no difficulty now to adapt the afore-mentioned non-linear function to the maximum inexactitudes to be expected with the elements forming the transforming arrangement or even to optionally increase the permissible variations.

The already mentioned exponential proportion is regarded as the ideal solution, since the permissible variations (i.e. the deviations from the nominal values) are independent of the absolute digital values the adjacent digital values being still clearly distinguishable. The exponential proportion for instance allows for the analogue voltage values corresponding to the numerical values "8" and "9" to deviate by ±50%, such permissible variation being given a priori with the digital values "1" and "2."

If, for instance, a pulse of 10-microsecond duration is chosen for the value "1," and a pulse of 20 $\mu$ sec. for the value "2," a voltage or pulse increase of 100%, proportional to the increment from the value "2" to the value "1," is present. This increase of 100% permits deviations in the analogue value representing the value "1" as well as the one representing the value "2," up to ±50% in the precision of the duration of the pulse, without causing a wrong value to be calculated. Such a wide range in the permissible variations, especially at the lower voltage values, is hardly ever necessary. It will therefore be sufficient if there is a direct, that is a linear proportion between the analogue values and the digital values up to the numerical values "3" or "4," the non-linearity overproportionality starting in the range of the intermediate and especially that of the higher numerical values. The exponential proportion is generally chosen so that the actually required permissible variations, which are usually much below 50%, are maintained.

A wide variety of known electronic elements may be used for the production of a device according to the invention; such elements may include pulse multipliers, delay lines or the like.

The generations of progressively spaced output pulses with the aid of pulse-repeating devices including delay lines requires an increased number of delaying sections for the latter, in order to maintain the leeway for permissible variations. According to a further feature of the invention, therefore, use is made of deflector tubes which are relatively inexpensive and independent in this operation of the maximum variations permitted.

When deflector tubes are used, their output electrodes can be arranged with the desired progressive separation from one another when the electron beam is deflected with constant speed. On the other hand it is also possible to deflect the electron beam with a varying speed which corresponds to the required progressive spacing, the output electrodes then being arranged at equal distances from one another. This speed will be so chosen that it is rather high at the beginning and decreases towards the end, so that the output electrodes are consecutively struck by the beam after increasing time intervals.

Figure 1:
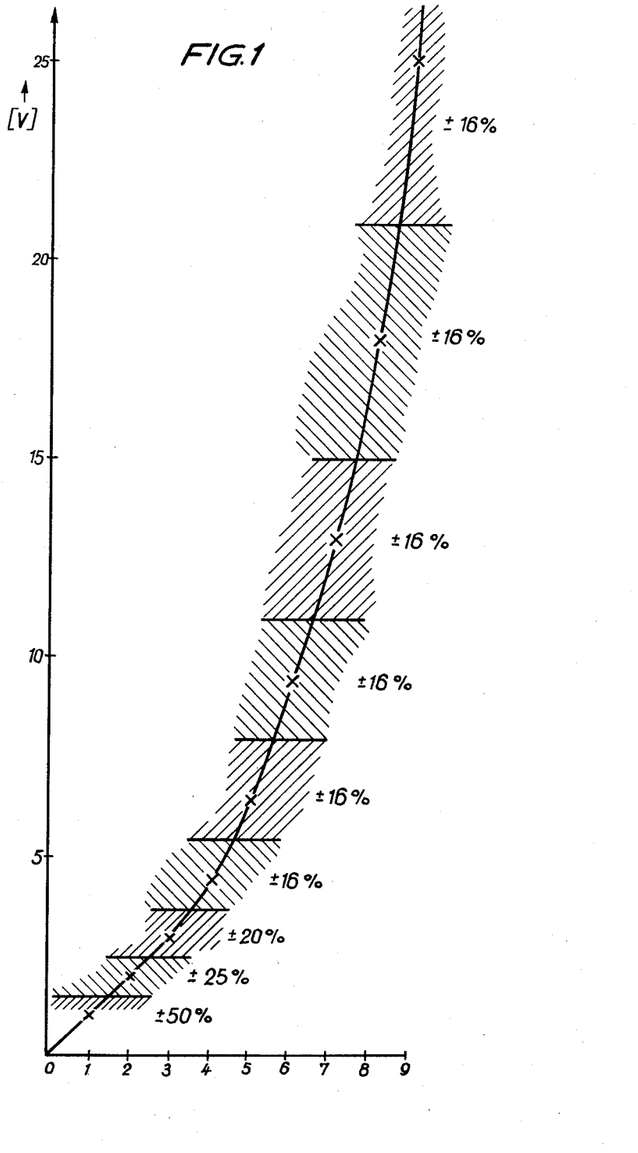
FIG. 1 is a graph showing the partial voltages to be attributed to the digits 1 to 9 which are to be set up in the control devices for the two values to be handled.

The graph of FIG. 1 shows by way of example the digital values 1 to 9 plotted against the corresponding partial voltages assigned to them by means of, for instance, a potentiometer arrangement. As will be seen, a linear proportion of the voltages in relation to the digital values is provided for in the range of the lower digits, as in this range deviations are possible of from ±20% to ±50% in any case. For the digits 4 to 9 the permissible variations chosen are ±16% on the average. These variation values can easily be maintained in electronic counting systems, even when many small deviations occur simultaneously, wherein mostly passive and very few active constructional elements are used, as for instance in the circuit arrangement shown in FIG. 3.

Figure 2:
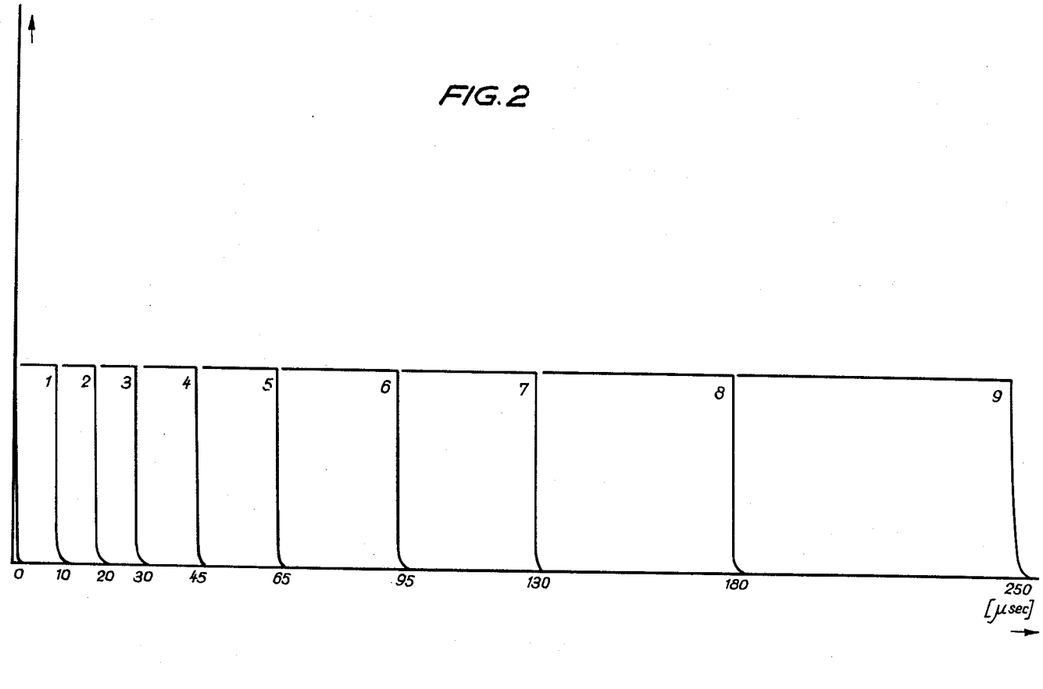
FIG. 2 is a graph of the widths of pulses to be derived from the partial voltages of FIG. 1 by means of a pulse-shaping assembly.

When the partial voltages of FIG. 1 representing the decimal digits are introduced into a pulse-shaping arrangement, in which the voltages are transformed into pulses of a width corresponding linearly to the voltages applied, pulses will result as shown in the graph of FIG. 2, the width of such pulses being then representative of the digital values set up.

In case of a linear proportion in the range of the lower digits, pulses of 10, 20 and 30 microseconds' duration or width will correspond to the digits 1, 2 and 3 when the pulse shaping device is so dimensioned that a partial voltage of 1 v. at its input end produces a pulse of 10 microseconds at the output. The permissible variations in the pulse widths according to FIG. 2 are naturally the same as those of the voltages according to FIG. 1.

Figure 3:
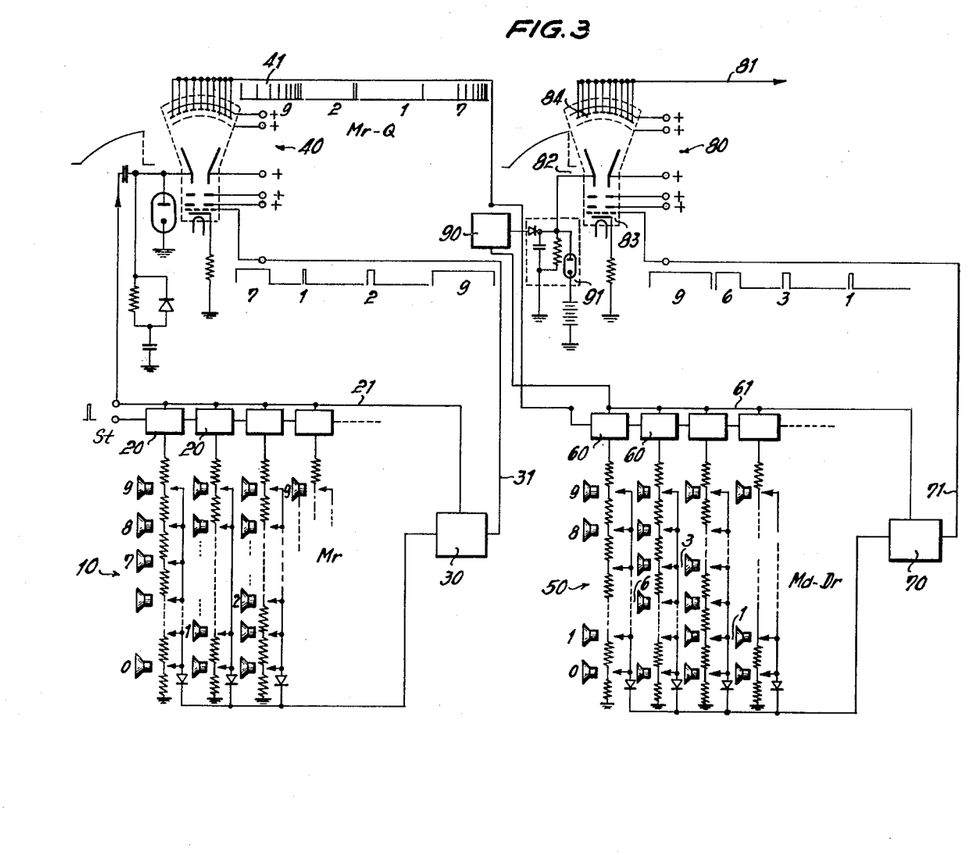
FIG. 3 is a circuit diagram of an electronic calculating device according to the invention provided with electron-beam-deflector tubes.

In the embodiment of an electronic calculating device shown in FIG. 3 the potentiometer arrangement 10 together with the pulse-shaping unit 30 and the electron-beam-deflector-tube circuit 40 represents the control system for the multiplier in the case of a multiplication. The potentiometer network 50 together with the pulse-shaping device 70 forms the control network for the multiplicand. The electron-beam-deflector-tube circuit 80 represents the electronic calculating system, i.e. the pulse-multiplying device. The shift register 60 is an electronically operated step-switch system which serves to consecutively connect the individual decades of the two control systems to the calculating arrangement. The shift register 20 is an electronically operated step-switch system which serves to consecutively handle each decimal position of the multiplier with the whole of the multiplicand in the control network 50/70.

Figure 5:
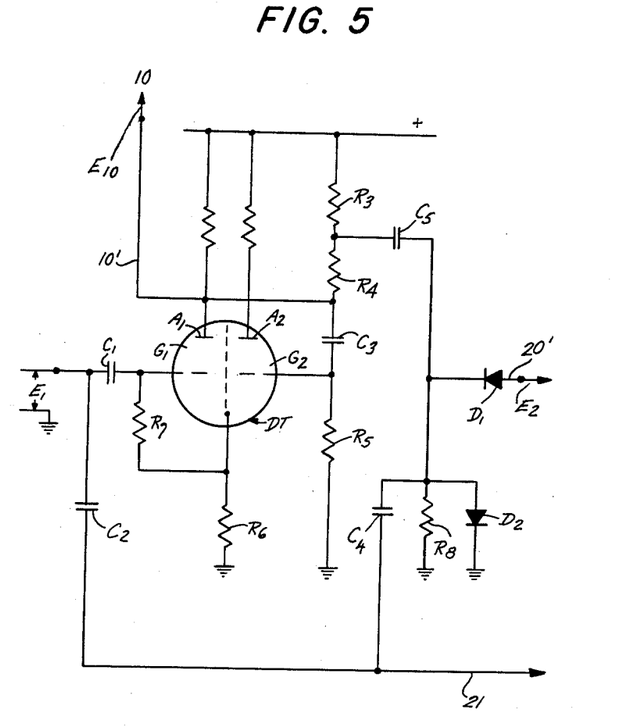
FIG. 5 is a circuit diagram of the shift registers utilized in the calculating devices of FIGS. 3 and 4.

The shift registers 20 and 60 shown in FIG. 5 each comprise a monostable-multivibrator switching circuit of the type generally described in Waveforms, edited by B. Chance, V. Hughes, E. F. McNichol, D. Syre and F. C. Williams, McGraw-Hill Book Co., Inc., New York, 1949, more particularly page 573.

When the left half $G_1$ of the double-triode multivibrator tube DT is in its normal, conducting stage and the right half $G_2$ thereof is non-conducting, a short negative pulse $E_1$ (FIG. 6) is fed to the grid of tube half $G_1$ over a D.-C. blocking condenser $C_1$ to cut off this portion of the tube DT and render its anode $A_1$ positive. The grid of the right tube half $G_2$, connected in series with a condenser $C_3$ to the anode $A_1$, then becomes positive to switch on its tube portion. The grid-cathode resistor $R_7$ maintains a negative blocking bias on the grid of tube portion $G_1$ for the duration of the blocking period determined by the time constant $C_1R_7$ which must be sufficiently large to counter the normally positive bias on this grid. The non-conductive condition of the tube portion $G_2$ is restored when the positive charge on the condenser $C_3$ is dissipated through the grid-leak resistor $R_5$ after a period determined by the time constant $C_3R_5$ which must be substantially less than the time constant $C_1R_7$ if the latter time constant is not to be limiting. Likewise, the tube portion $G_1$ is restored to its conducting condition upon the dissipation of the negative charge upon its grid.

It will thus be apparent that the triggering signal $E_1$, which blocks the tube half $G_1$, causes a positive pulse $E_{10}$ (FIG. 6) to be fed via lead 10′ to the voltage divider 10 associated with the block 20. The output pulse $V_{30}$ from this divider is of a magnitude associated with the numerical value corresponding to one of the selector buttons of the voltage divider and is fed into the pulse shaper 30 which, as previously described, produces a pulse $E_{31}$ whose duration $t_{30}$ is directly proportional to the magnitude of the pulse $V_{30}$. The pulse $E_{31}$ is applied, via a lead 31, to the control grid of the sweep generator 40 (FIG. 3) and determines the duration of activation of this sweep generator which is, of course, a period sufficient to permit a number of pulses proportional to the selected value to appear at the output thereof. The deflector plates of the sweep generator 40 are energized via a lead 21 with saw-tooth pulses $E_{21}$ (FIG. 6) resulting from the charging of its coupling condenser which is fed by the output pulse $E_{10}$, appearing at the anode $A_1$, via the condensers $C_4$ and $C_5$. Simultaneously the pulse $E_{10}$ energizes the pulse-shaping unit 30. The saw-tooth pulses $E_{21}$ serve to sweep the beam of sweep generator 40 across the terminals as described hereinafter.

Figure 6:
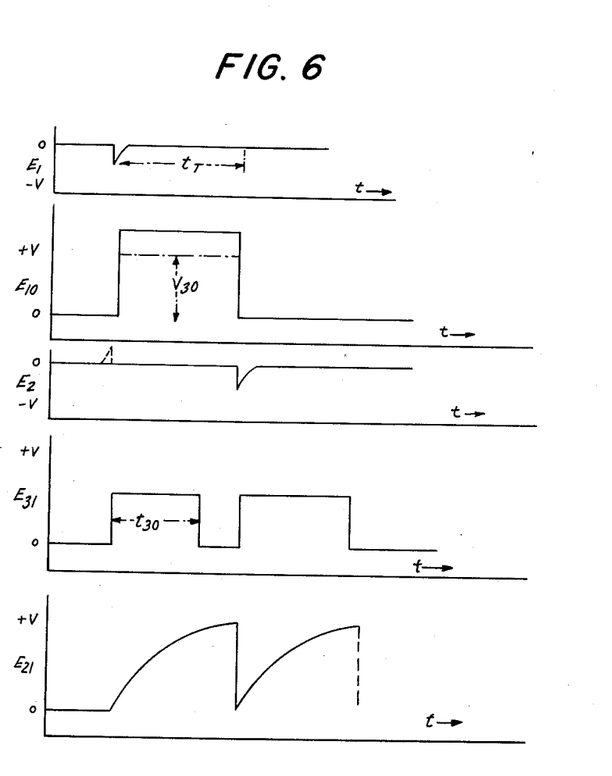
FIG. 6 is a graph of the wave forms developed in the arrangement of FIG. 3.

The decade-switching operation of block 20 (FIG. 5) to connect successive voltage dividers to the pulse shaper 30 occurs as follows: The positive signal $E_{10}$, divided by the resistors $R_3$, $R_4$ is fed to a differentiating network including the condenser $C_5$ and a resistor $R_8$ which produces a negative spike (shown in solid lines) at the leading edge of the pulse $E_{10}$ and a positive spike (shown in dotted lines) at the trailing edge thereof. The positive one of these spikes, which are best seen at $E_2$ in FIG. 6, is clipped by the diodes $D_1$, $D_2$ while the negative spike is fed to the successive block 20 via the lead 20′ to trigger the next shift register into operation as described. Thus, positive pulses corresponding to successive digits preset on the voltage dividers will appear at the pulse shaper 30. In an identical manner, the shift registers 60 and their voltage dividers 50 function to produce the multipliers fed to the product-forming device 80. The multiplier and the multiplicand are set up in the potentiometer arrangements 10 and 50 by producing the corresponding values of voltage as shown in FIG. 1 by means of the sets of keys corresponding to the digits 0 to 9. These values will remain stored during the whole duration of the calculating process. By pressing down one of the keys 10 or 50 a voltage divider is tapped. By means of a key lock known per se, which holds the key in the depressed position, the voltage corresponding to the keyed value is made available until after upon completion of the calculation the key lock is released, so that all the depressed keys jump back to their normal position and the contacts closed by them are opened. The effect and the construction of such key locks have been known for a long time in calculating machines of mechanical construction.

When the multiplier is set in the potentiometer arrangement 10 and the multiplier is set in the potentiometer arrangement 50, a starting key applies the initial negative pulse to the first shift register 20. The multivibrator of this member flips into its off-normal position, as described with reference to FIG. 5, and sends a pulse to the deflector plate of the sweep-generator tube 40. Thereupon the cathode ray, owing to the non-linearity of the saw-tooth pulse $E_{21}$, runs once over all the terminals of the tube 40.

At the first non-linear voltage divider of the first key array for the numerals 0–9 there is a continuous voltage during the existence of the pulse $E_{10}$; the partial voltage (e.g. $V_{10}$) corresponding to that of the depressed key, e.g. key 7, is fed to the pulse-shaping unit 30 as the initiating energization for the grid. The right-hand portion of the pulse-width multivibrator then flips into its conducting position and remains in this state under the effect of the continuous voltage supplied by the voltage divider 10 for a period sufficient to permit a pulse of the length corresponding to the selected numeral "7" to appear on the lead 31, reference being had to the first pulse "7" of the pulse sequence 7-1-2-9 shown. This pulse of length "7" is then fed to the grid of the cathode-ray tube 40 and suppresses the cathode ray as soon as its first seven terminals have been scanned thereby. Therefore, seven individual pulses appear on conductor 41 (see the pulse sequence on adjacent lead 41).

When the monostable multivibrator DT flips back into its normal position as described, it provides the starting pulse $E_2$ to the second shift register 20. The same operation is repeated, until all the selected multiplier values (e.g. "7," "1," "2," "9") have been fed as individual pulses of corresponding lengths to the lead 31 and have been delivered by the line 41 as pulse sequences with the corresponding number of pulses. The individual pulses appearing on line 41 enter the multiplicand part of the multiplier device in a manner similar to that of the starting pulse on the first shift register 20 in the multiplier part. The first pulse of the pulse group (e.g. the one assigned to numeral "7") is fed through line 41 to start the first multivibrator 60, and, since the number "9631" has been selected as the multiplicand, a pulse of a width corresponding to the first digit "9" is fed to the deflection tube 80. Again the individual decades of the multiplicand are scanned consecutively in the manner discussed above in connection with the multiplier, and pulses of the widths corresponding to the digits "9," "6," "3," "1" appear consecutively on line 71. These pulses produce consecutive pulse trains of nine, six, three and one pulses, respectively.

The shift register 60 has to be set at a speed of operation $n$ times as great as that of the shift registers 20, the number "$n$" being the number of decades in the potentiometer arrangement 50, in order to prevent the second pulse on line 41 from reaching the first member 60 before the value represented by the first seven pulses is derived from the last member 60 and processed through the tube 80.

It will be apparent that the pulses on line 61 simultaneously have to be sent to a decade co-ordinator in the product-forming mechanism which connects successively lower decadic units of potentiometer 50 to the line 81 upon the conclusion of each pulse sequence.

In the operating cycle of the shift register 60 reading the digit values of the subsequent decimal positions of this factor, correspondingly shaped pulses will appear at the output of the pulse-shaping device 70 and will be supplied to the control grid 83 of the electron-beam-deflector tube 80 over the lead 71. The first pulse of this series of this factor will now be handled together with the first pulse leaving the electron-beam-deflector tube system 40 over the lead 41. In the same way the subsequent output pulses leaving the pulse-shaping device 70 will be handled in the calculating device, i.e. the electron-beam-deflector tube 80.

This is effected by the cooperation of each single pulse arriving over the lead 41 and the corresponding pulse series consisting of one pulse each per M$d$-D$r$ decimal position, that is per step of the shift register 60 transmitted via the common output line 61.

The procedure is repeated with the second pulse of the first pulse series representing the first digit of the multiplier. This pulse is simultaneously delivered to the calculating device 80 and to the input of the shift register 60. At the output of the individual stages of the shift register 60 this pulse produces a series of pulses on the common output line 61 which is on the one hand delivered to the input 82 of the electron-beam-deflector tube 80, and which on the other hand leaves the pulse shaping device 70 as a series of pulses of differing width which are delivered to the grid 83 of the calculating device 80.

In the above-described way each individual pulse of a pulse series representing the first digit of the multiplier consecutively releases a pulse series of as many pulses as correspond to the digit value of the multiplicand stored in the control network 50 to 70. By the cooperation of the pulse series appearing simultaneously on the leads 41, 61 and 71 the calculating device 80 will be actuated over its inputs 82, 83 in the following way:

The pulses produced by the shift register 60 on the line 61 will be delivered to the multivibrator 90 and from there to the pulse-forming unit 91, which forms a pulse with a rather steep rise at the beginning, the rising rate, however, decreasing steadily until a maximum voltage has been reached, after which the pulse decays almost instantaneously. This pulse is delivered to the deflector plates of the electron tube 80, i.e. to the input 82. The shape, the duration and the voltage of the input pulse at the input 82 are so chosen that the electron beam is deflected over the field between the right and the left deflector plate with a high starting speed which steadily decreases. During its deflection from the right to the left deflector plate the electron beam consecutively strikes ten individual anodes 84, which are each connected to a common output line 81 arranged outside the tube itself or at least outside the region, which is swept by the electron beam during its deflecting movement. At the moment of the decay of the voltage of the pulse at the input 82 to zero the electron beam is made ineffective in order to be returned to the right side without influencing the anodes 84. This is effected in known manner.

Simultaneously with the deflection of the electron beam one pulse of the pulse series reaching the control grid 83 of the tube 80 over the lead 71 becomes effective. As has been explained above, the widths of these pulses correspond to the digit values of the multiplicand in a non-linear proportion. The duration of a pulse corresponding to the digit 1 is relatively small (e.g. 10 microseconds).

This pulse will make the electron beam effective for a period of time during which it passes the first anode with a relatively high speed. The same is done by such pulses corresponding to the digital values 2 and 3. The control pulses delivered to the control grid 83 for these digits have 20 and 30 microseconds' duration, respectively, and make the electron beam effective for this same period of time, so that it will be deflected over the first two or the first three of the anodes 84 with undiminished speed.

As was described above there is a non-linear proportion between the higher digits and their corresponding pulse widths, the deflecting pulse voltage at the plates 82 being adjusted to this non-linearity. In this way it is possible to exactly correlate the non-linear pulse widths, which correspond to the linear decimal numbers, with the non-linear speed of deflection of the electron beam and with the corresponding generation of pulses on the output anodes 84. Each single pulse arriving on the lead 41 therefore releases a plurality of pulse trains on the lead 81, the number of pulses in each pulse train being in conformity with the digits set up in the potentiometer arrangement 50.

Each pulse train on the lead 41 corresponds to the digit of one decimal position of the value set up in the potentiometer arrangement 10. One pulse train on the lead 41 handled jointly with a plurality of pulse trains on the lead 71 represents a multiplication of a one-digit multiplier Mr with a multidigit multiplicand Md.

The electron-beam-deflector-tube circuit 40 at the output of the control assembly Mr for the representation of the multiplier (quotient) works in the same way as the electron-beam-deflector tube circuit 80, so that its method of operation need not now be described.

As is also evident, the handling of the following decimal positions of the multiplier will be effected in the same way by the cooperation of the shift register 20, the potentiometer arrangement 10, the pulse-shaping device 30 and the electron-beam-deflector-tube circuit 40.

In order to realize the non-linear relationship of the analogue quantities with the digital values registered in the calculating mechanism, it appears desirable to simplify the electrical dimensions of the electron-beam-deflector-tube circuit 80 according to FIG. 3. In the system already described it is very important that the shape of the pulses delivered to the deflector plates 82 be conformed to the chosen non-linear proportion of the pulse widths at the control grid 83. This is as such not very difficult. Sometimes, however, it may be feasible to choose another solution in which a simple linear sawtooth pulse will be sufficient as the deflecting voltage. This sawtooth pulse will cause the electron beam to be deflected with constant speed between the two deflector plates. To make up for this, the distance between each two subsequent individual anodes 84 will have to differ in the same non-linear proportion. Thus the anodes will have to be arranged very close to each other at one end, their distance, however, increasing towards the other end.

Pulses on lead 31 are generated through the pulse-shaping unit 30 from voltages originating from the shift register 20 and keyed by means of the potentiometer arrangements 10. The pulse-shaping unit is illustrated in detail in FIG. 4. The pulses on lead 41 of FIG. 3 are the output pulses of the deflector-tube circuit 40. They are generated under the control of lead 31 connected to the grid of tube 40.

Pulses on lead 71 are generated through the pulse-shaping unit 70 from the scanning voltages of the multiplicand registered on the potentiometer arrangement 50. The output lead 21 of the shift register synchronizes the non-linear-deflection generator of the deflector tube 40 and the pulse-shaping unit 30. The non-linear deflector pulse shown at the extreme left of FIG. 3 causes the cathode ray of tube 40 to pass from left to right over the anodes, first rapidly and then at a steadily slowing pace.

Figure 4:
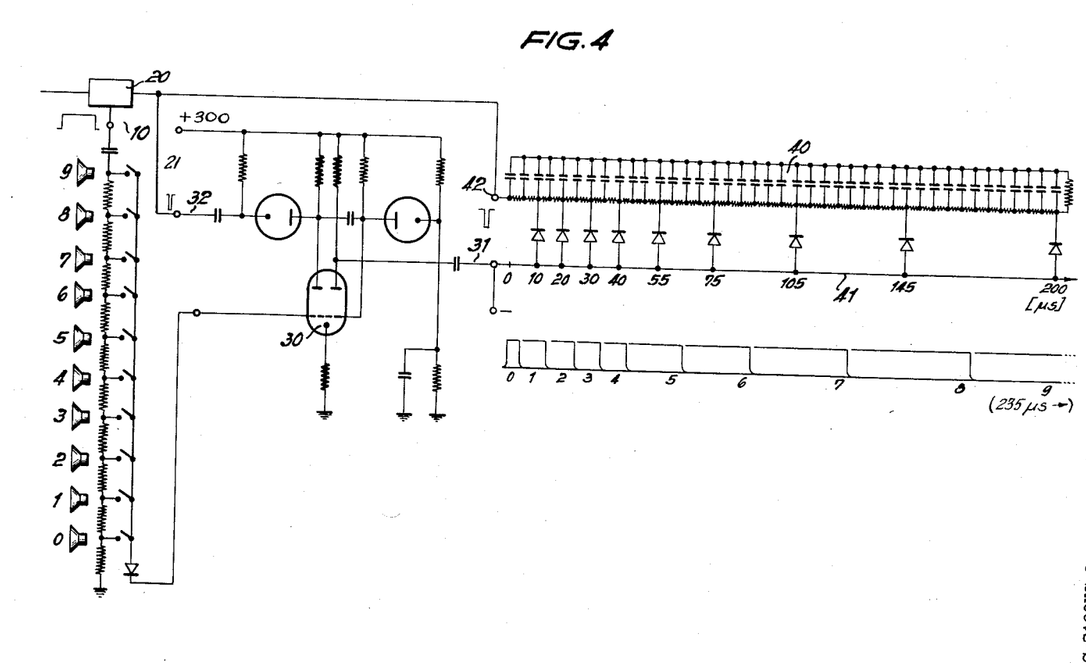
FIG. 4 is a partial circuit diagram of an electronic calculating device utilizing a delay line.

A further embodiment of the invention in its application to a digital calculating device is shown in FIG. 4. In the potentiometer arrangement 10, of which one decimal position only of the corresponding potentiometer arrangement of FIG. 3 is shown, the digital values are set up to produce the corresponding partial voltages as shown in FIG. 1. As the shift register 20 now consecutively reads the individual decimal places, pulse voltages will be produced at the upper end of the potentiometer arrangement; these pulse voltages, being representative of the digital vaues set up, will also appear at the grid of the monovibrator tube 30 which is connected as a pulse-shaping device. This mode of connection is known per se, its construction and working method being described in "Wave Forms," Radiation Laboratory Series, Massachusetts Institute of Technology, Louis N. Ridenour, 1949, pages 170 and 573. When a starting pulse is now applied to the input 32 there will be a control pulse at the output 31, the width and duration of this pulse corresponding to the digit set up as in FIG. 2. Ten such pulses representing the digits 0–9, which alternatively result therefrom, have been drawn up on the right-hand side of FIG. 4 in the correct proportion. In this circuit arrangement a delay line 40' is used as the calculating device, this delay line having nine lateral branch lines for the digits 1 to 9. The delay line shown here has a delay time of 5 microseconds for each delaying section and a total delay time of 200 to 250 microseconds. The branch lines to the common output line 31 for the digital values have been drawn up in proportion to the corresponding pulses on the output line 31, that is to say substantially in accordance with the proportions already shown in FIGS. 1 and 2. Naturally this proportion can be adapted to other permissible maximum variations, if necessary.

The parts shown in FIG. 4 serve for the representation of either the multiplier or the multiplicand. It will be understood that in case this arrangement is used for the representation of the multiplier an analogue arrangement must be added for the representation of the multiplicand.

The delay line 40' of FIG. 4 performs the same function as the tube 40 of FIG. 3. The system utilizing the delay line 40' operates as follows: The pulse generated by the pulse-shaping unit 30, which has a duration corresponding to the selected digital value, keeps the decoupling diodes between the line 40' and the lead 41 in a conductive state until the number of individual pulses corresponding to this pulse shape have passed from the line 40' to the lead 41. In operation it may be assumed that a starting pulse is delivered to the shift register 20. As described with reference to FIG. 3, each input signal at 20 is simultaneously sent to the multivibrator 30 and to the delay-line system 40'. From the member 20 a voltage (e.g. $E_{10}$) is impressed on the non-linear voltage divider 10. Depending on the depressed selector key, a fraction of this voltage is led to the left grid of the double triode 30. In normal position, i.e. when the anode of the right side of the double triode 30 is positively charged, all the diodes along the line 41 must be blocked. For this purpose, a negative bias is applied to the line 41 as indicated in FIG. 4. By virtue of the voltage of the left grid and the starting pulse at the input 32, the double triode of unit 30 flips and its left anode becomes positively charged. A pulse therefore appears on line 41, its duration being a function of the values represented by the numerals "0," "1," "2," "3" etc. registered in the potentiometer arrangement 10. As long as this starting pulse acts in line 41, the negative bias for the diodes is suppressed and they are charged.

The above-mentioned starting pulse arriving at the input 42 in the delay-line system 40' passes through this system 40' and delivers a pulse to the line 41 at each neutralization of its original bias. If, for instance, a pulse of a length corresponding to the numeral "7" is present, then one pulse each of the first seven diodes reached the line 41. Therefore, the pulses from the eighth and ninth diodes can no longer flow into the line 41, since in the meantime the clamping pulse of the tube 30 has terminated and has restored the diodes into the non-charged state. The output lead conducts the resulting pulse train, consisting of a number of impulses corresponding to the number registered in the potentiometer arrangement 41, to the multiplier 80 as previously described.

The invention shall not be limited to the embodiments shown and to the multiplication of two factors. The circuit arrangement shown as well as other switching arrangements may serve to carry out the four basic calculating operations by making use of the same partially analogue, partially digital system.

I claim:

1. A device for converting selected numerical values related to one another as consecutive integers into electrical signals, comprising a source of stepped voltages differing by progressively increasing increments of magnitude, and individual, independently operable selector means respectively assigned to each of said values for selecting a respective one of said voltages.

2. A device for converting selected numerical values related to one another as the numerical integers one through nine into electrical signals, comprising a source of nine stepped voltages of which at least the five highest ones differ from one another by progressively increasing increments and individual independently operable selector means respectively assigned to each of said values for selecting a respective one of said voltages.

3. A device for converting selected numerical values related to one another as consecutive integers into electrical signals, comprising a source of stepped voltages differing by progressively increasing increments of magnitude, individual, independently operable selector means respectively assigned to each of said values for selecting a respective one of said voltages, and pulse-shaping means for producing a signal of a duration proportional to the magnitude of the selected voltage.

4. A device for transforming electrical potential differences representative of variable magnitudes within a range of values into pulse trains representative of said values, comprising signal-generator means; input means coupled to said signal-generator means for selectively producing control voltages characteristic of any of said values; output means including a plurality of terminals and control means for sequentially connecting said terminals in circuit with said signal-generator means for sequential energization of said terminals, thereby producing at said terminals, respectively, a train of pulses, and means for spacing said pulses in a progressively increasing manner at least at the ultimate portion of said train; and circuit means including said input means, said output means, and said signal-generator means for cutting off said train of pulses in response to a selected control voltage upon generation of a number of pulses proportional to the value corresponding to said selected control voltage.

5. A device for transforming electrical potential differences representative of variable magnitudes within a range of stepped values into pulses representative of said values, comprising signal-generator means; non-linear voltage-divider means coupled to said signal-generator means for selectively producing control voltages characteristic of any of said values, the ratios of the magnitudes of said voltages to the respective values of at least the higher-value portion of said range being progressively increasing; output means including a plurality of terminals and control means for sequentially connecting said terminals in circuit with said signal-generator means for sequential energization of said terminals, thereby producing at said terminals, respectively, a train of pulses, and means for spacing said pulses in a progressively increasing manner at least at the ultimate portion of said train; and circuit means including said voltage-divider means, said output means and said signal-generator means for cutting off said train of pulses in response to a selected control voltage upon generation of a number of pulses proportional to the value corresponding to said selected control voltage.

6. A device for transforming electrical potential differences representative of variable magnitudes within a range of values into pulse trains representative of said values, comprising signal-generator means; input means coupled to said signal generator means for selectively producing control voltages characteristic of any of said values; non-linear sweep-generating means having a plurality of terminals and including control means for sequentially connecting said terminals in circuit with said signal-generator means for sequential energization of said terminals at successively increasing intervals of at least the terminal portion of the sequence, thereby producing at said terminals, respectively, a train of pulses, and means for spacing said pulses in a progressively increasing manner at least at the ultimate portion of said train; and circuit means including said input means, said sweep-generator means and said signal-generator means for cutting off said train of pulses in response to a selected control voltage upon generation of a number of pulses proportional to the value corresponding to said selected control voltage.

7. A device for transforming electrical potential differences representative of variable magnitudes within a range of stepped values into pulse trains representative of said values, comprising substantially linear signal-generator means; non-linear voltage-divider means coupled to said signal-generator means for selectively producing control voltages characteristic of any of said values, the ratios of the magnitudes of said voltages to the respective values of at least the higher-value portion of said range being progressively increasing; delay-line means having a plurality of terminals connectable in circuit with said signal-generator means for sequential energization of said terminals at successively increasing intervals of at least the terminal portion of the sequence, thereby producing a train of pulses whose spacing increases substantially exponentially at least at the ultimate portion of said train; and circuit means including said voltage-divider means, said delay-line means and said signal-generator means for cutting off said train of pulses in response to a selected control voltage upon generation of a number of pulses proportional to the value corresponding to said selected control voltage.

8. A device for transforming electrical potential differences representative of variable magnitudes within a range of multidigit numerical values into pulse trains representative of respective digits of said values, comprising a plurality of non-linear voltage dividers respectively assigned to each of said digits; signal-generator means including a plurality of shift registers adapted to energize said voltage dividers successively for selectively producing control voltages characteristic of any of said values, said signal-generator means further including pulse-shaper means responsive to said control voltages for forming a signal whose duration is linearly related to the magnitude of a respective control voltage; output means having a plurality of terminals and including control means for sequentially connecting said terminals in circuit with said signal-generator means for sequential energization of said terminals, thereby producing at said terminals, respectively, a train of pulses, and means for spacing said pulses in a progressively increasing manner at least at the ultimate portion of said train; and circuit means including said voltage dividers, said output means and said signal-generator means responsive to said signal for cutting off said train of pulses upon generation of a number of pulses proportional to the value corresponding to said respective control voltage.

9. A device for transforming electrical potential differences representative of variable magnitudes within a range of stepped multidigit numerical values into pulse trains representative of respective digits of said values, comprising a plurality of non-linear voltage dividers respectively assigned to each of said digits; pushbutton means associated with each of said voltage dividers for selectively tapping the latter; signal-generator means including a plurality of shift registers adapted to energize said voltage dividers successively for selectively producing control voltages which are characteristic of any of said values, said signal-generator means further including pulse-shaper means responsive to said control voltages for forming a signal whose duration is linearly related to the magnitude of a respective control voltage; pulse-generator means having a plurality of terminals and including control means for sequentially connecting said terminals in circuit with said signal-generator means for sequential energization of said terminals, thereby producing at said terminals, respectively, a train of pulses, and means for spacing said pulses in an exponentially increasing manner at least at the ultimate portion of said train; and circuit means including said voltage dividers, said pulse-generator means and said signal generator means responsive to said signal for cutting off said train of pulses upon generation of a number of pulses proportional to the value corresponding to said respective control voltage.

10. A device for transforming electrical potential differences representative of variable magnitudes within range of multidigit numerical values of respective digits of said values, comprising a plurality of non-linear voltage dividers respectively assigned to each of said digits; signal-generator means including a plurality of shift registers adapted to energize said voltage dividers successively for selectively producing control voltages characteristic of any of said values, said signal-generator means further including pulse-shaper means responsive to said control voltages for forming a signal whose duration is linearly related to the magnitude of a respective control voltage; sweep-generator means having a plurality of terminals and incuding control means for sequentially connecting said terminals in circuit with said signal-generator means for sequential organization of said terminals at a progressively diminishing rate, thereby producing at said terminals, respectively, a train of pulses, and means for spacing said pulses in a progressively increasing manner at least at the ultimate portion of said train; and circuit means including said voltage dividers, said sweep-generator means and said signal-generator means responsive to said signal for cutting off said train of pulses upon generation of a number of pulses proportional to the value corresponding to said respective control voltage.

11. A device for converting numerical values, selected from a series of integers, into electrical signals respectively representing such selected numerical values, comprising, in combination, generator means for producing a pulse train in which the number of consecutive pulses appearing within different portions of said pulse train after its start represents a corresponding different integer, respectively, and including means for spacing said pulses in such a manner that the spacing between consecutive pulses increases progressively at least in a portion of said pulse train remote from its start; control means cooperating with said generator means for starting a pulse train and for cutting off said pulse train after the generation by said generator means of a number of pulses corresponding to a selected numerical value; and selector means cooperating with said control means for setting the latter for cutting off said pulse train after a period of time corresponding to the number of pulses representing said selected numerical value.

12. A device for converting numerical values, selected from a series of integers, into electrical signals respectively representing such selected numerical values, and for producing electrical signals representing a multiplication product of such selected numerical values, comprising, in combination, first and second generator means for producing each a pulse train in which the number of consecutive pulses appearing within different portions of said pulse train after its start represents a corresponding different integer, respectively, each including means for spacing said pulses in such a manner that the spacing between consecutive pulses increases progressively at least in a portion of said pulse train remote from its start; first control means cooperating with said first generator means for starting a first pulse train and for cutting off said first pulse train after the generation by said first generator means of a number of pulses corresponding to a first selected numerical value representing a multiplier; first selector means cooperating with said first control means for setting the latter for cutting off said first pulse train after a period of time corresponding to the number of pulses representing said selected numerical values; second control means cooperating with said second generator means for starting a second pulse train and for cutting off said second pulse train after the generation by said second generator means of a number of pulses corresponding to a selected numerical value representing a multiplicand; second selector means cooperating with said second control means for setting the latter for cutting off said second pulse train after a period of time corresponding to the number of pulses representing said second numerical value; circuit means connecting the output of said first generator means with said second control means for triggering the latter to start said second pulse train upon application of each pulse of said first pulse train appearing at said output; and output means for delivering a result consisting in the product of the number of pulses in said second pulse train and the number of pulses in said first pulse train.

References Cited in the file of this patent

UNITED STATES PATENTS

| | | |
|---|---|---|
| 2,272,070 | Reeves | Feb. 3, 1942 |
| 2,556,200 | Lesti | June 12, 1951 |
| 2,632,147 | Mohr | Mar. 17, 1953 |
| 2,641,698 | Gloess | June 9, 1953 |
| 2,867,380 | Piel et al. | Jan. 6, 1959 |

OTHER REFERENCES

Korn and Korn, Electronic Analog Computers, McGraw-Hill Book Co., Inc., 1952 (page 254 relied on).

Slaughter: An Analog-to-Digital Converter With an Improved Linear Sweep Generator, part 7, Convention Record of the March 23–26, 1953, IRE National Convention, April 1953 (pages 7 to 12).